United States Patent
Mitchell et al.

(10) Patent No.: US 10,676,591 B2
(45) Date of Patent: Jun. 9, 2020

(54) CONDUCTIVE FLUOROPOLYMER COMPOSITIONS

(71) Applicant: 3M INNOVATIVE PROPERTIES COMPANY, St. Paul, MN (US)

(72) Inventors: Michael H. Mitchell, Woodbury, MN (US); Tatsuo Fukushi, Woodbury, MN (US); Muhammad Z. Nawaz, North Tustin, CA (US); Michael C. Dadalas, Burghausen (DE); Klaus Hintzer, Kastl (DE); Tilman C. Zipplies, Burghausen (DE); Denis Duchesne, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/775,469

(22) PCT Filed: Oct. 21, 2016

(86) PCT No.: PCT/US2016/058142
§ 371 (c)(1),
(2) Date: May 11, 2018

(87) PCT Pub. No.: WO2017/083076
PCT Pub. Date: May 18, 2017

(65) Prior Publication Data
US 2018/0362727 A1    Dec. 20, 2018

Related U.S. Application Data

(60) Provisional application No. 62/254,004, filed on Nov. 11, 2015.

(51) Int. Cl.

| | |
|---|---|
| *C08K 5/06* | (2006.01) |
| *C08F 214/26* | (2006.01) |
| *C08K 3/04* | (2006.01) |
| *C08K 13/02* | (2006.01) |
| *C08J 3/16* | (2006.01) |
| *H01M 8/0228* | (2016.01) |
| *H01M 8/0221* | (2016.01) |
| *H01M 8/0213* | (2016.01) |
| *C08J 3/12* | (2006.01) |
| *C08J 3/21* | (2006.01) |
| *H01M 8/0226* | (2016.01) |

(52) U.S. Cl.
CPC .............. *C08K 5/06* (2013.01); *C08F 214/26* (2013.01); *C08J 3/124* (2013.01); *C08J 3/16* (2013.01); *C08J 3/21* (2013.01); *C08J 3/212* (2013.01); *C08K 3/04* (2013.01); *C08K 13/02* (2013.01); *H01M 8/0213* (2013.01); *H01M 8/0221* (2013.01); *H01M 8/0226* (2013.01); *H01M 8/0228* (2013.01); *C08J 2327/12* (2013.01); *C08J 2327/18* (2013.01); *C08K 2201/001* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 4,391,940 A * | 7/1983 | Kuhls | ................... | C08F 259/08 |
| | | | | 523/201 |
| 5,463,021 A * | 10/1995 | Beyer | ....................... | C08F 6/24 |
| | | | | 528/482 |
| 5,502,097 A * | 3/1996 | Saito | ....................... | C08K 7/02 |
| | | | | 524/356 |
| 7,740,915 B2 * | 6/2010 | Cavero | .................. | C09D 5/031 |
| | | | | 427/470 |
| 2002/0132906 A1 * | 9/2002 | Kondo | ..................... | C08K 3/04 |
| | | | | 524/496 |
| 2002/0136941 A1 * | 9/2002 | Bonnet | .................. | B82Y 30/00 |
| | | | | 252/511 |
| 2002/0168569 A1 | 11/2002 | Barriere | | |
| 2004/0262584 A1 * | 12/2004 | Bonnet | ............... | H01M 8/0213 |
| | | | | 252/511 |

(Continued)

FOREIGN PATENT DOCUMENTS

| | | | |
|---|---|---|---|
| JP | S61-69853 A | 4/1986 | |
| JP | 104640926 A | 5/2015 | |

(Continued)

OTHER PUBLICATIONS

"FEP 6300GZ FEP Dispersion", Technical Information, 3M™ Dyneon™, 2009, URL <http://multimedia.3m.com./mws/media/5713370/dyneon-fep-6300q-z.pdf?fn=FEP%206300G%20Z.pdf>,pp. 1-2, XP055337687.

(Continued)

*Primary Examiner* — Katie L. Hammer
(74) *Attorney, Agent, or Firm* — Thomas M. Spielbauer

(57) ABSTRACT

A composition of solid particles comprising substantially inorganic, electronically conductive particles and fluoropolymer particles, wherein the fluoropolymer is melt-processable and has a melting point between 100° C. and 325° C. and a melt flow index at 372° C. and at 5 kg load (MFI 372/5) of at least 0.1 and up to 100 g/10 min, and wherein the fluoropolymer particles have a particle size of less than 500 nm and wherein the particles comprising the substantially inorganic, electronically conductive material is present in the form of particles having a particle size of less than 15,000 μm, and methods for producing such compositions and articles containing such compositions.

17 Claims, No Drawings

(56) References Cited

U.S. PATENT DOCUMENTS

| | | | |
|---|---|---|---|
| 2007/0015937 A1 | 1/2007 | Hintzer | |
| 2007/0155891 A1* | 7/2007 | Tsuda | C08F 6/16 |
| | | | 524/544 |
| 2008/0161481 A1* | 7/2008 | Abusleme | C08L 27/12 |
| | | | 524/544 |
| 2008/0274295 A1* | 11/2008 | Cavero | C09D 5/031 |
| | | | 427/485 |
| 2011/0293920 A1* | 12/2011 | McKeen | C09D 127/18 |
| | | | 428/323 |

FOREIGN PATENT DOCUMENTS

| | | |
|---|---|---|
| WO | WO 2000-58389 | 10/2000 |
| WO | WO 2013-103345 | 7/2013 |

OTHER PUBLICATIONS

"Fluoroplastic FEP 6300GZ", Product Data Sheet, Commercial Product 3M™ Dyneon™, 2016, URL <http://multimedia.3m.com/mws/media/6887440/td-fep-6300gz-eng.pdf>, pp. 1-3, XP055335145.
International Search Report for PCT International Application No. PCT/US2016/058142, dated Feb. 6, 2017, 5 pages.

\* cited by examiner

CONDUCTIVE FLUOROPOLYMER COMPOSITIONS

CROSS REFERENCE TO RELATED APPLICATIONS

This application is a national stage filing under 35 U.S.C. 371 of PCT/US2016/058142, filed Oct. 21, 2016, which claims the benefit of Provisional Application No. 62/254,004, filed Nov. 11, 2015, the disclosure of which is incorporated by reference in their entirety herein.

FIELD

The disclosure relates to conductive fluoropolymer compositions having improved electrical properties. The present disclosure further relates to shaped articles prepared with the compositions and to methods of making such articles and such compositions.

BACKGROUND

Compositions of inorganic particles can be used as starting materials for the production of components for electricity generating or electrochemical equipment, for example electrolytic cells and fuel cells and in particular for separator plates of fuel cells. Such separator plates (often also referred to as "bipolar plates") are designed to distribute reactants over the active areas of a fuel cell and contain microchannels for that purpose. They also remove heat and conduct electronic current from cell to cell. A typical separator plate for a fuel cell is shown in WO2013/103345A1. Materials made from inorganic particles are often difficult to process into the desired shape and binders are added to improve the mechanical properties and processing of the material. As described in international patent application WO2013/103345A1 fluoropolymer particles can be added to produce a composition that is then shaped into bipolar separation plates.

SUMMARY

Surprisingly it has been found that compositions as described herein have improved conductive properties. In one aspect of the following disclosure there is provided a composition of solid particles comprising substantially inorganic, electronically conductive particles and fluoropolymer particles, wherein the fluoropolymer is melt-processable and has a melting point between 100° C. and 325° C. and a melt flow index at 372° C. and at 5 kg load (MFI 372/5) of at least 0.1 and up to 100 g/10 min, and wherein the fluoropolymer particles have a particle size of less than 500 nm and wherein the particles comprising the substantially inorganic, electronically conductive material is present in the form of particles having a particle size of less than 15,000 μm.

In another aspect there is provided a method for producing a composition of solid particles comprising
(i) contacting substantially inorganic particles that are electronically conductive and have a particle size of less than 15,000 μm with an aqueous fluoropolymer dispersion having fluoropolymer particles of less than 500 nm particle size;
(ii) removing water and—if present—surfactants to yield dry particles at conditions where the fluoropolymer does not melt;
wherein the fluoropolymer is melt-processable and has a melting point between 100° C. and 325° C. and a melt flow index at 372° C. and at 5 kg load (MFI 372/5) of at least 0.1 and up to 100 g/10 min.

In a further aspect there is provided a method of providing a shaped article comprising
(i) providing a composition of solid particles comprising substantially inorganic, electronically conductive particles and fluoropolymer particles, wherein the fluoropolymer is melt-processable and has a melting point between 100° C. and 325° C. and a melt flow index at 372° C. and at 5 kg load (MFI 372/5) of at least 0.1 and up to 100 g/10 min, and wherein the fluoropolymer particles have a particle size of less than 500 nm and wherein the particles comprising the substantially inorganic, electronically conductive material is present in the form of particles having a particle size of less than 15,000 μm;
(ii) optionally, converting the composition into an aqueous paste, and
(iii) subjecting the composition to molding to yield a molded article.

In yet another aspect there is provided an article comprising a component obtained from molding the composition of solid particles.

DETAILED DESCRIPTION

Before any embodiments of this disclosure are explained in detail, it is to be understood that the disclosure is not limited in its application to the details of construction and the arrangement of components set forth in the following description. The disclosure is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%" or weight percent) unless specified otherwise. The amounts of all ingredients gives 100% wt unless specified otherwise. If the amount of ingredients is identified by % mole the amount of all ingredients gives 100% mole unless specified otherwise.

Unless explicitly stated otherwise, all embodiments of the present disclosure can be combined freely.

In the following there is provided a composition of solid particles. Typically, such compositions are free-flowing compositions of dry particles, such as powders. The compositions can be processed into a shaped article, for example by molding, although other ways of processing may be used. "Molding" as used herein is a shaping step where the composition is entered into a form (the mold) and then subjected to heat or pressure or both to form a shaped article that can be removed from the mold.

The compositions may be used to prepare aqueous pastes, for example, by suspending or dispersing them in water. Such aqueous dispersions typically are dispersions of high viscosity such as pastes and may have a solid content of from about 10% to about 90% by weight based on the total weight of the composition. The amount of solid content may depend on the desired viscosity of the resulting dispersion.

Preferably, the compositions provided herein are compositions of solids, more particular, of dry particles, for example in the form of a free flowing powder. The particles may have a particle size of less than 15,000 µm, or less than 5,000 µm. Generally, the average particle size is from 500 nm to about 2,000 µm ($D_{50}$). The particles may be substantially spherical, by which is meant to include spherical particles and elongated particles that can be approximated as spheres having a longest axis that is up to 2 times the length of the second longest axis (that is, an aspect ratio of from 1:1 to 2:1). The particles may alternatively be in the form of fibers, for example fibers where the longest axis has more than 5 times or more than 10 times the length of the fiber diameter. Alternatively, the particles may have other shapes.

The particles may be a blend of particles of different chemical compositions, i.e. fluoropolymer particles on the one hand and substantially inorganic, electronically conductive particles on the other hand. In a preferred embodiment, the fluoropolymer particles are coated onto or adsorbed onto the substantially inorganic particles. In such embodiment the fluoropolymer particles and substantially inorganic particles may still be present in the form of a free flowing composition of solids, e.g. in the form of a free-flowing powder.

Typically, the compositions provided herein may contain from about 1% by weight of one or more fluorinated polymer and at least from 60% by weight of substantially inorganic and electronically conductive material (for discussions of these compositions, the weight percentages are based on the total weight of solids which in some embodiments corresponds to the total weight of the composition, but in any event, the total amount of solids does not exceed 100%). Preferably the composition comprises at least 70% by weight and more preferably at least 73% by weight and most preferably at least 82% by weight of the substantially inorganic and electronically conductive material. Preferred amounts of fluoropolymer include from 5 wt. % to 25% wt. more preferably from 7% wt. to 17% wt.

In one embodiment the composition consists of fluoropolymer and the inorganic material and from 0 to 5% by weight, preferably from 0 and up to 1%, or more preferably from 0 to less than 0.5% by weight of other ingredients such as impurities or residues from producing the compositions.

The compositions according to the present disclosure typically have a thermal conductivity of at least 5 W/m·K at 25° C., preferably of at least 10 W/m·K at 25° C. Preferably, the moldable compositions according to the present disclosure exhibit a volume resistivity of less than 0.12 Ω·cm, preferably of less than 0.10 Ω·cm, more preferably of less than 0.08 Ω·cm, and even more preferably less than 0.06 Ω·cm.

In a preferred embodiment of the present disclosure the moldable compositions exhibit an electrical conductivity of at least 18 S/cm. In a preferred embodiment the moldable compositions according to the present disclosure have an electrical conductivity of at least 18 S/cm and a thermal conductivity of at least 5 W/m·K at 25° C.

Fluoropolymers

The fluoropolymers used in the present disclosure are melt-processable. This means the fluoropolymers have a melt flow index (MFI) at 372° C. and a 5 kg load (MFI 372/5) of at least 0.1 g/10 min, preferably at least 5 g/10 min (MFI 5/372). Typically the upper limit is 100 g/10 min, preferably up to 75 g/10 min.

The fluoropolymers may be fully or partially fluorinated which means they may have partially or fully fluorinated backbone. Suitable fluoropolymers are those that have a backbone that is at least 30% by weight fluorinated, preferably at least 50% by weight fluorinated, more preferably at least 65% by weight fluorinated. Examples of suitable fluoropolymers include polymers and copolymers of one or more fluorinated monomers in combination with one or more other fluorinated monomer and/or one or more non-fluorinated monomers. Examples of fluorinated monomers include fluorinated $C_2$-$C_8$ olefins that may or may not have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF), fluorinated alkyl vinyl monomers such as hexafluoropropylene (HFP); fluorinated vinyl ethers, including perfluorinated vinyl ethers (collectively referred to as PVE) and fluorinated allyl ethers including perfluorinated allyl ethers (collectively referred to as PAE).

Examples of suitable allyl and vinyl ethers include those corresponding to the general formula

$$CF_2=CF-(CF_2)_n-O-Rf \qquad (I).$$

In formula (I) n represents either 0 or 1. Rf represents a linear or branched, cyclic or acyclic perfluorinated alkyl residue containing at least one catenary oxygen atom. Rf may contain up to 8, preferably, or up to 6 carbon atoms, such as 1, 2, 3, 4, 5 and 6 carbon atoms. Typical examples of Rf include linear, branched alkyl residues interrupted by one oxygen atom, and linear or branched alkyl residues containing 2, 3, 4 or 5 catenary ether oxygens. Further examples of Rf include residues containing one or more of the following units and combinations thereof:
—($CF_2$O)—, —($CF_2CF_2$—O)—, (—O—$CF_2$)—, —(O—$CF_2CF_2$)—, —CF($CF_3$)—, —CF($CF_2CF_3$)—, —O—CF($CF_3$)—, —O—CF($CF_2CF_3$)—, —CF($CF_3$)—O—, —CF($CF_2CF_3$)—O—. Further examples of Rf include but are not limited to: 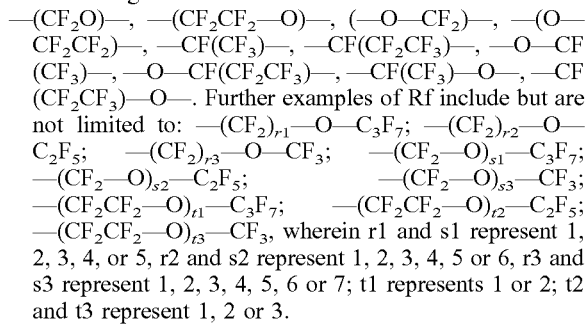 —($CF_2$)$_{r1}$—O—$C_3F_7$; —($CF_2$)$_{r2}$—O—$C_2F_5$; —($CF_2$)$_{r3}$—O—$CF_3$; —($CF_2$—O)$_{s1}$—$C_3F_7$; —($CF_2$—O)$_{s2}$—$C_2F_5$; —($CF_2$—O)$_{s3}$—$CF_3$; —($CF_2CF_2$—O)$_{t1}$—$C_3F_7$; —($CF_2CF_2$—O)$_{t2}$—$C_2F_5$; —($CF_2CF_2$—O)$_{t3}$—$CF_3$, wherein r1 and s1 represent 1, 2, 3, 4, or 5, r2 and s2 represent 1, 2, 3, 4, 5 or 6, r3 and s3 represent 1, 2, 3, 4, 5, 6 or 7; t1 represents 1 or 2; t2 and t3 represent 1, 2 or 3.

Suitable non-fluorinated comonomers include vinyl chloride, vinylidene chloride and $C_2$-$C_8$ olefins such as ethylene (E) and propylene (P). The amount of non-fluorinated comonomer when present is generally between 0 and 50 mole %, preferably between 1 and 40 mole %.

Specific examples of copolymers include for example copolymers having a combination of monomers as follows: VDF-HFP, TFE-P, VDF-TFE-HFP, VDF-TFE-PVE, TFE-HFP, E-TFE-HFP, TFE-PVE, E-TFE-PVE and any of the aforementioned copolymers further including units derived from a chlorine containing monomer such as CTFE.

Preferably, the fluoropolymers are fully fluorinated, which means they are made up of perfluorinated comonomers. More preferably, the polymers are copolymer of TFE and at least one or more than one other perfluorinated comonomer. Typically, the amount of comonomer is from greater 1.5% wt. based on the weight of the fluoropolymer, preferably, greater than 5.0% wt. Typical amounts of comonomers can be up to 45% by weight. Preferred comomoners include HFP, PVE's, PAE's and combinations thereof, and most preferably the comonomer includes HFP.

The fluoropolymers, preferably copolymers, employed in the present disclosure exhibit melting points in the range of from 90 to 325° C., preferably in the range of from 100 to 310° C., more preferably in the range of from 110 to 300° C., most preferably from about 190° C. to about 280° C. When referred herein to a melting point the melting point of the once molten material is meant unless stated otherwise. Polymers with a very high content of TFE-units tend to have different melting points when being molten for the first time and after being molten for the first time, in which case the melting point tends to be somewhat lower. However, once the material has been molten the melting point remains constant.

Substantially Inorganic, Electronically Conductive Materials

The substantially inorganic and electronically conductive inorganic material of the present disclosure refers to inorganic material which exhibits either electrical conductivity or thermal conductivity both at ambient conditions (25° C.). "Substantially inorganic" as used herein means the material is predominantly inorganic but some non-inorganic material can be tolerated. The substantially inorganic material comprises inorganic material that is electronically conductive in an amount of at least 50% by weight, or at least 70% by weight or at least 95% and preferably 100% by weight based on the total weight of the material.

The inorganic material includes inorganic elements, alloys and blends thereof. The inorganic materials include metals and non-metals, such as carbon. Preferred inorganic materials comprise metals and metal alloys including steel, bronze, silver, platinum, gold, copper, tin, zinc, titanium, and iron. Particular examples of carbon that may be used in the compositions include graphite and other electronically conductive types of carbon, including, for example, carbon nanotubes. Most preferred is graphite.

The inorganic material is present in particulate form. The particles may be of regular or irregular shape. Typically, the particles are of small size and have a particle size of less than 15,000 μm or even less than 5,000 μm. Preferably, the particles have an average particle diameter ($D_{50}$) in the range of from 10 μm to 1500 μm.

Methods of Making the Compositions

The compositions of solids described herein can be obtained by combining an aqueous composition comprising dispersed fluoropolymer with the substantially inorganic particles and removing the aqueous phase to obtain the dried particles. Preferably, the particles are obtained as coagulates. The aqueous phase is removed under conditions at which the fluoropolymer does not melt to avoid the formation of clumps because the particles might bind to each other through the molten polymer. Also the surfactants, if present, are removed, preferably thermally but under conditions at which the fluoropolymer does not melt to obtain a composition of free-flowing particles. The type of surfactants and fluoropolymers may be adjusted accordingly. For example, surfactants, if necessary, are chosen to evaporate or degrade at temperatures below the melting point of the fluoropolymer used. The compositions of free-flowing particles as provided herein are essentially free of non-ionic surfactants, and preferably, essentially free of any surfactants.

Preferably, an aqueous fluoropolymer dispersion is combined with the inorganic particles to form a homogenized mixture. Fluoropolymers and inorganic particles are added in amounts to achieve the fluoropolymer content and inorganic particle content as described above. Typically, the weight ratio of fluorinated polymer to inorganic particles is from 1:99 to 1:3, preferably from 1:19 to 1:10; more preferably from 1:12 to 1:4.6.

Typically, the aqueous dispersion for making the moldable compositions contains at least 1% and up to about 25% by weight based on the weight of the total amount of solids of the fluoropolymers. Preferred amounts of fluoropolymers include from 5 wt. % to 19% wt. more preferably from 7% wt. to 17% wt. The inorganic particles may be added in an amount of from 60% by weight, preferably at least 70% by weight and more preferably at least 73% by weight (the weight percentages are based on the total weight of solids and the total amounts of solids does not exceed 100%). The substantially inorganic particles may be added as solids but may also be added as a dispersion or suspension, preferably as aqueous dispersion or suspension. Surfactants may be added to the dispersion or suspension to improve wetting of the particles, but this may not be required and the amounts of surfactant can be kept low. Preferably the dispersion or suspension of the substantially inorganic particles is essentially free of non-ionic emulsifiers or essentially free of any emulsifiers.

The substantially inorganic particles used to make the compositions have the particle sizes and shapes as described above. Typically, the particle size is less than 15,000 μm, preferably less than 5,000 μm. Preferably, the particles have an average particle size ($D_{50}$) of up to 1,500 μm, for example from 10 μm to 1,500 μm. In one preferred embodiment electronically conductive carbon particles, such as graphite, is used, preferably graphite particles are used having an average particle size ($D_{50}$) of from 10 μm to 1,000 μm, preferably from 10 μm to 800 μm.

The particles may be combined with the fluoropolymer dispersion as such. Preferably the inorganic particles are part of an aqueous dispersion or suspension and are then combined with the fluoropolymer dispersion.

The inorganic particles may be wetted. For example, they may be dispersed or suspended in aqueous composition containing a low amount of a wetting emulsifier. Typically, the amount of wetting emulsifiers is less than 1,000 ppm based on the amount of the dispersion or suspension. Preferably, the wetting emulsifier is a non-ionic emulsifier although cationic, anionic or zwitterionic emulsifiers may also be used. Preferred examples of non-ionic wetting emulsifiers include: siloxane emulsifiers, sugar-based emulsifiers and low fluorinated emulsifiers (fluorinated emulsifiers with less than 5 fluorine atoms per molecule, preferably from 2 to 4 fluorine atoms per molecule.

Fluoropolymer dispersions can be used as known in the art. Typically fluoropolymers are produced by a radical polymerization in an aqueous medium (also referred to in the art as "emulsion polymerization). The polymerization is typically carried out in the presence of a fluorinated emulsifier. The resulting dispersions have fluoropolymer particles of small size, typically particles with sizes less than 500 nm, typically an average particle size of from about 50 to less than 500 nm, or from 180 to 340 nm (volume-average). Preferably, the fluoropolymer dispersions used herein were prepared using a fluorinated emulsifiers of the general formula (II)

are used. In formula (II) L represents a linear or branched cyclic partially or fully fluorinated alkylene group or an aliphatic hydrocarbon group, $R_f$ represents a linear or branched, partially or fully fluorinated aliphatic group or a linear or branched partially or fully fluorinated group that may be interrupted once or more than once by an oxygen atom. $X^+$ represents a cation. In case the emulsifier contains a partially fluorinated aliphatic group it is referred to as a partially fluorinated emulsifier. Preferably, the molecular weight of the anionic part of the emulsifier is less than 1,000 g/mole, most preferably the molecular weight of the emulsifier is less than 1,000 g/mole. Preferably, L is linear. Specific examples of fluorinated emulsifiers include those as described in, for example, US Pat. Publ. 2007/0015937 (Hintzer et al.). Exemplary emulsifiers include but are not limited to: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. Such fluorinated emulsifiers provide less stable dispersion than their oxygen-free homologues, which facilitates the co-coagulation of fluoropolymer particles and inorganic particles.

The fluoropolymer dispersions may be stabilized. This means they may contain one or more non-fluorinated stabilizing non-ionic emulsifier of the general formula (III):

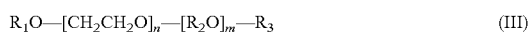

$$R_1O\text{---}[CH_2CH_2O]_n\text{---}[R_2O]_m\text{---}R_3 \quad (III)$$

wherein $R_1$ represents a linear or branched aliphatic or aromatic hydrocarbon group. Preferably $R_1$ has at least two carbon atoms, preferably at least 6 carbon atoms, more preferably 8 to 18 carbon atoms. In a preferred embodiment, the residue $R_1$ is a residue $(R')(R'')C$— wherein $R'$ and $R''$ are the same or different, linear, branched or cyclic alkyl groups, wherein the total amount of carbon atoms is at least 6 and preferably from 8 to 18. In formula (III) $R_2$ represents an alkylene unit, preferably having 3 or 4 carbon atoms. $R_3$ represents hydrogen, or a hydrocarbon group that may additionally contain hydroxyl and ether groups. Preferably, $R_3$ is hydrogen or a $C_1$-$C_3$ alkyl or hydroxyl alkyl group. Preferably, $R_3$ is chosen such that a terminal hydroxyl group is present. For example $R_3$ can be H or a hydroxyalkyl residue such as hydroxy alyklene groups, for example hydroxy methlyene (—$CH_2$)OH). n represent an integer and may be 0 or greater than 0. Typically, n has a value of 0 to 40. m is an integer and represents 0 or an integer that is greater than 0. Typically m has a value of 0 to 40. The sum of n+m is at least 1, preferably at least 2.

In a typical embodiment $R_1$ is a linear or branched alkyl group having from 8 to 18 carbon atoms; $R_2$ represents an alkyl group having 3 carbon atoms and $R_3$ is a hydrogen and n is as above.

In one embodiment of the present disclosure, a fluoropolymer dispersion is used that is not stabilized. In this embodiment the fluoropolymer dispersion is essentially free of non-ionic emulsifiers, and in particular free of emulsifiers according to formula (III) above. "Essentially free of non-ionic emulsifiers" as used herein means less than 1,000 ppm and preferably 0 ppm of non-ionic emulsifiers based on the total weight of the composition. Unstabilized fluoropolymer dispersions may lead to a clearer phase separation after coagulation, which allows for easier work-up of the aqueous phase. Typically, the aqueous phase obtained after the coagulation is clear and does not contain any visible particles. It can be treated to remove fluorinated emulsifiers—if present—by known methods, such as anion-exchange treatment. Also, the surfactants do not need to be removed in a separate processing step to avoid interference of their residues in the final product. Moreover, dried powders can be produced without risking the fluoropolymers to melt which may not be possible if the surfactants have to be removed, for example by heating.

The mixtures obtained by combining the fluoropolymers and the substantially inorganic materials are typically homogenized by stirring and the liquid phase which is typically aqueous, and the surfactant—if present—are removed, preferably thermally. The conditions are chosen such that the fluoropolymer particles do not melt to obtain free-flowing particles.

The compositions of the present disclosure are preferably obtained by coagulating the aqueous mixture of the combined fluoropolymer and inorganic particles. Coagulation is preferably achieved mechanically, for example by applying shear force, such as stirring. The coagulation may also be initiated by addition of salts, mineral acids, polymeric flocculation agents, or high pressure, or by freeze coagulation. The mother liquid is separated and the wet blend is further washed with water or water/organic solvent mixtures. From the combined mother liquid the fluorinated emulsifiers can be recovered (if present) using known procedures, such as ultrafiltration or anion-exchange. The particles coagulated particles typically contain fluoropolymer particles deposited or adsorbed onto the inorganic particles.

Drying may be carried out by any means know in the art suitable for this purpose. However, it is preferred to dry the particles at temperatures below the melting point of the fluorinated polymer.

The dried composition can be used to produce shaped articles, or it can be re-dispersed suspended in an aqueous medium to provide an aqueous dispersion which can then be used to coat materials.

Methods of Producing Shaped Articles

The moldable compositions according to the present disclosure can be used to produce shaped articles, for example by molding the composition in a mold. Pressure and heat or pressure only may be applied. The conditions are preferably chosen such that the fluoropolymers melt which will effectively bind the coated inorganic particles together. It is believed that by the methods described herein, a more homogeneous distribution of polymer coated particles can be achieved which leads to improved physical properties as is demonstrated in the examples below.

Shaping may be carried out in a single step or in a multi-step process. For example, pre-forming may be carried out as cold pressing and subsequent forming may be carried out as hot pressing in adequate tooling well-known to the skilled person. Further optional subsequent steps may include surface grinding and machining the article to desired surface finish and/or desired shapes. Other ways of forming shaped articles may be used also.

The compositions provided herein may be converted into aqueous dispersions and may be used to coat substrates. In particular porous substrates may be conveniently coated by aqueous dispersions according to the present disclosure. The coated substrates are then subjected to heat and or pressure to provide conditions at which the fluoropolymer melts.

Shaped Articles

The compositions described herein are moldable and they may be used to prepare shaped articles. To produce a shaped article by molding the composition is entered into a shaped form and then subjected to heat and/or pressure, typically under conditions where the fluoropolymer melts. The shaping process may involve forming a pre-formed article, and heat-pressing the pre-formed article to obtain a final molded article. In this regard, it is preferred to apply the temperature sufficient to melt the at least one fluorinated polymer only after the pre-forming step. For example, pre-forming may be carried out as cold pressing and subsequent forming may be carried out as hot pressing in adequate tooling well-known to the skilled person, preferably at conditions where the fluoropolymer melts. Further optional subsequent steps may include surface grinding and machining the article to desired surface finish and/or desired shapes.

By using the compositions provided herein shaped articles may be obtained having a thermal conductivity of at least 5 W/m·K at 25° C., preferably of at least 10 W/m·K at 25° C. The molded articles may exhibit a volume resistivity of less than 0.12 Ω·cm, preferably of less than 0.10 Ω·cm, more preferably of less than 0.08 Ω·cm, and even more preferably less than 0.06 Ω·cm. The molded articles may further exhibit an electrical conductivity of at least 18 S/cm. Preferably, the molded article exhibits a combination of average thermal conductivity, volume resistivity and electrical in the preferred and further preferred ranges. Such articles may have a fluoropolymer content of from greater 10 and less than 20% by weight based on the weight of the article and a content of "inorganic particles" of at least 80% by weight based on the weight of the article with the total amount of components not exceeding 100%. Preferably, the "inorganic particles" are an electronically conductive form of graphite.

Due to the thermal and electrical properties of the molded article of the present disclosure it may be conveniently used as a component in an electricity generating device, for example as a component of electrochemical apparatus including fuel cells, electrolytic cells. Particular examples include but are not limited to electrodes, and separator plates for fuel cells.

EXAMPLES

The present disclosure is further illustrated by way of examples without however intending to limit the disclosure to the examples and specific embodiments illustrated. Prior to that the test methods used to characterize materials and their properties are described.

Determination of Solid Content

The solid content was determined gravimetrically according to ISO 12086.

Particle Size

Particle size of fluoropolymer particles in dispersions was measured via inelastic light scattering using a Malvern 1000 HAS Zetasizer. The average particle size is reported as the volume average diameter. Particle sizes on solid compositions were determined laser diffraction analysis (ISO 13320) using HELOS (helium-neon optical system) [H 1959]+ RODOS from Sympatech GmbH, Germany. The manufacturers recommendations for equipment and procedures are to be followed selecting the appropriate equipment for specific particle size ranges in particle size ranges others than those described in the examples are to be determined. Average particle sizes are expressed as $D_{50}$ value.

MFI and Melting Points

Melt flow index and melting points were determined according to ISO 12086 (version in use in 2015).

Thermal Conductivity

Thermal conductivity and thermal resistivity was determined on a Netzsch Nano Flash LFA 447 in accordance with ASTM E1461-13 (published in October 2013).

Electrical Conductivity and Electrical Volume Resistivity

Measurements were taken on a Loresta 4 probe volume resistivity meter from Mitsubishi Petrochemical in accordance with ASTM F84-98 as published in November 1998.

Comparative Examples 1.0 and 1.2

Samples were prepared by adding graphite (Superior Graphite, grade LP 27-290068 (average particle size measured on a Helos [H 1959]+Rodos instrument: $d_{50}$ 484 μm) and FEP powder ($d_{50}$=8 μm (8000 nm), melting point 255° C.; MFI [372° C./5 kg]=24 g/10 min) to a plastic container and shaking the closed container for about 20 min. Samples with FEP content of 15 and 20% wt were prepared this way (comparative examples 1.0 and 1.2).

Examples 1.0 and 1.2

To an aluminium tray, graphite (Superior Graphite, grade LP 27-290068 (average particle size—measured on a Helos [H 1959]+Rodos instrument: $d_{50}$ 484 μm) was charged. 20% by weight based on solids of an aqueous, anion-exchanged and FEP dispersion (stabilized with non-ionic surfactant (Genapol X080=6.6 wt. %) was added (example 1.0). The FEP polymer had a melting point of FEP=254° C., MFI (372° C./5 kg) of 8.9 g/min. The dispersion had a solid content=56 wt %, and a particle size ($d_{50}$) of 117 nm. The contents of the tray were mixed until they appeared homogenous by the change of color in graphite from silver to a dull black. The samples were dried overnight at 110°. Samples with 15% wt FEP content were prepared in the same way (example 1.2).

Samples from Comparative examples 1.0 and 1.2 and Examples 1.0 and 1.2 were cold pressed in a 5.08 cm×7.62 cm mold at a pressure of about 13.8 MPa and hot pressed in graphite tooling at conditions outlined below. The samples were then ground to even out the surfaces.

TABLE 1

Experimental Conditions for hot pressing FEP/graphite mixtures.

| Sample | FEP content [wt.-%] | T [° C.] | p [MPa] | Time [min] |
|---|---|---|---|---|
| Example 1.0 | 20 | 280 | 4.14 | 40 |
| Comp. Ex. 1.0 | 20 | 285 | 5.52 | 30 |
| Example 1.2 | 15 | 280 | 4.14 | 40 |
| Comp Ex 1.2 | 15 | 285 | 5.52 | 30 |

Thermal and electrical testing was then carried out on the billets at 25° C. The results of the thermal conductivity testing are summarized in table 2, while the results of the electrical conductivity testing are summarized in table 3.

TABLE 2

Thermal Conductivity Test Results at 25° C.

| Sample | Average Thermal Conductivity [W/m · K] | Average Thermal Diffusivity [mm²/s] | Density [g/cm³] | Specific Heat Capacity [J/g · K] |
|---|---|---|---|---|
| Example 1.0 | 10.4 | 5.25 | 2.013 | 0.98 |
| Comparative Example 1.0 | 8.6 | 4.276 | 2.039 | 0.98 |
| Example 1.2 | 10.9 | 5.49 | 2.044 | 0.97 |
| Comparative Example 1.2 | 5 | 2.195 | 2.022 | 1.13 |

TABLE 3

Electrical Conductivity Test Results.

| Sample | Thickness [mm] | Resistivity Correction Factor | Volume Resistivity [Ω · cm] | Conductivity [S/cm] |
|---|---|---|---|---|
| Example 1.0 | 8.33 | 3.158 | 0.064 | 15.580 |
| Comp Ex 1.0 | 9.19 | 2.953 | 0.176 | 5.685 |
| Example 1.2 | 10.48 | 2.781 | 0.041 | 24.452 |
| Comp. Ex 1.2 | 5.38 | 3.895 | 0.156 | 6.403 |

Example 2

Mix 90:10 (Graphite/FEP by wt %)

0.1% (wt) trisiloxane was added to 342 g $H_2O$ to reduce the surface tension to about 20.5 mN/m. 80 g of graphite (LP27) were added and suspended. 20 g of FEP particles were are added to the graphite suspension. The FEP particles were added as an aqueous dispersion (34.9% FEP content; fluoroemulsifier content ~1000 ppm; $d_{50}$=121 nm; melting point=255° C.; MFI [372° C./5 kg]=23.5 g/10 min). The FEP dispersion was not anion-exchanged and contained no non-fluorinated emulsifiers. The resulting mixture was stirred at 500 rpm for 65 min after which a clear phase separation of coagulate and aqueous phase was observed. The mother liquid was separated. The wet blend was washed with water and then dried at 180° C. for 6 hours to provide a free flowing powder. Analysis by microscopy showed that graphite particles were coated by fluoropolymer. The solid composition was analysed for its electrical properties as described above. The results are shown in the table 4 below and indicate that the conductivity of the samples could be increased further by using a "non-stabilized" FEP-dispersion.

TABLE 4

Electrical conductivity results at 25° C.

| Sample | Volume Resistivity [Ω · cm] | Conductivity [S/cm] |
|---|---|---|
| Example 2 (20 % FEP) | 0.0586 | 18 |

The results shown in the above tables indicate that free-flowing powder obtained from a dispersion has superior properties than a free-flowing powder obtained from a dry blend. The conductivity could be further increased by using a powder obtained from a non-stabilized dispersion.

List of Particular Embodiments

The following list of particular embodiments illustrates the present disclosure further. It is meant for illustration only and it is not intended to limit the disclosure to the particular embodiments listed.

1. A composition of solid particles comprising substantially inorganic, electronically conductive particles and fluoropolymer particles, wherein the fluoropolymer is melt-processable and has a melting point between 100° C. and 325° C. and a melt flow index at 372° C. and at 5 kg load (MFI 372/5) of at least 0.1 and up to 100 g/10 min, and wherein the fluoropolymer particles have a particle size of less than 500 nm and wherein the particles comprising the substantially inorganic, electronically conductive material is present in the form of particles having a particle size of less than 15,000 μm.
2. The composition of embodiment 1 being a free flowing powder.
3. The composition of any one of the preceding embodiments having an electrical conductivity according to ASTM F84 of at least 18 S/cm at 25° C.
4. The composition of any one of the preceding embodiments comprising from at least 5 wt.-% to no greater than 25 wt.-% of the fluoropolymer and from at least 74 wt.-% of substantially inorganic electronically conductive material wherein the weight percentages are based on the total weight of the composition and wherein the total weight of the composition is 100%.
5. The composition of any one of the preceding embodiments wherein the substantially inorganic material is selected from metals, metal alloys, and an electronically conductive form of carbon.
6. The composition of any one of the preceding embodiments wherein the substantially inorganic material is selected from graphite.
7. The composition of any one of the preceding embodiments consisting of from 7 to 17% by weight of fluoropolymer, from at least 80% by weight of graphite and from 0% to less than 5% of other materials, and wherein the total amount of ingredients is 100% by weight.
8. The composition of any one of the preceding embodiments consisting of from 7 to 17% by weight of fluoropolymer, from at least 80% by weight of graphite and from 0% to less than 5% of other materials, and wherein the total amount of ingredients is 100% by weight and having an electrical conductivity according to ASTM F84 of at least 18 S/cm at 25° C.
9. The composition of any one of the preceding embodiments wherein the fluoropolymer particles are either coated or adsorbed onto the substantially inorganic particles.
10. The composition of any one of the preceding embodiments comprising from 0 to less than 1,000 ppm of non-ionic emulsifiers of the general formula corresponding to the general formula:

$R_1O—[CH_2CH_2O]_n—[R_2O]_m—R_3$ wherein $R_1$ represents a linear or branched aliphatic or aromatic hydrocarbon group; $R_2$ represents an alkylene unit; $R_3$ represents hydrogen, or a hydrocarbon group that may contain one or more hydroxyl groups, ether groups and combinations thereof; m is 0, 1 or an integer of greater than 1 and n is an integer of 0, 1 or an integer greater than 1 and n+m is not 0.
11. The composition of any one of the preceding embodiments comprising from 0 to less than 1,000 ppm of non-ionic emulsifiers.
12. The composition of any one of the preceding embodiments wherein the composition is obtained by subjecting an aqueous dispersion comprising the fluoropolymer particles and the substantially inorganic particles to a heat-treatment that removes water and surfactants under conditions where the fluoropolymer does not melt.
13. The composition of any one of the preceding embodiments wherein the solid particles are coagulated particles.
14. Method for producing a composition of solid particles comprising (iii) contacting substantially inorganic particles that are electronically conductive and have a particle size of less than 15,000 μm with an aqueous fluoropolymer dispersion having fluoropolymer particles of less than 500 nm particle size;

(iv) removing water and—if present—surfactants to yield dry particles at conditions where the fluoropolymer does not melt;

wherein the fluoropolymer is melt-processable and has a melting point between 100° C. and 325° C. and a melt flow index at 372° C. and at 5 kg load (MFI 372/5) of at least 0.1 and up to 100 g/10 min.

15. The method of embodiment 14, wherein the particles are coagulated before or during step (ii).

16. The method of any one of the preceding embodiments 14 or 15, wherein the fluoropolymer dispersion is essentially free of non-ionic emulsifiers.

17. The method of any one of the preceding embodiments 14 to 16 wherein the composition is a free-flowing powder.

18. The method of any one of the preceding embodiments 14 to 17 wherein the composition is a free flowing powder and is essentially free of non-ionic surfactants.

19. The method of any one of the preceding embodiments 14 to 18, further comprising (iii) molding the composition into a shaped article, wherein prior to molding the composition may optionally be suspended or dispersed in an aqueous phase to provide a paste.

20. Method of providing a shaped article comprising
(iv) providing a composition according to claim 1;
(v) optionally, converting the composition into an aqueous paste, and
(vi) subjecting the composition to molding to yield a molded article.

21. Article comprising a component obtained from molding the composition of any one of the preceding embodiments 1 to 13.

22. Article comprising a component obtained from molding the moldable composition of any one of the preceding embodiments 1 to 13, wherein the component is selected from a component of a fuel cell.

23. Article comprising a component obtained from molding the moldable composition of any one of the preceding embodiments 1 to 13, wherein the article is a bipolar separator plate for a fuel cell.

The invention claimed is:

1. A powder composition comprising perfluoropolymer particles adsorbed or deposited onto electronically conductive particles comprising at least 95% by weight inorganic material that is electronically conductive based on the total weight of the electronically conductive particles, wherein the perfluoropolymer is a copolymer of tetrafluoroethylene and at least one other perfluorinated comonomer and is melt-processable and has a melting point between 100° C. and 325° C. and a melt flow index at 372° C. and at 5 kg load of at least 0.1 and up to 100 g/10 min, and wherein the perfluoropolymer particles have a particle size of less than 500 nm and wherein, electronically conductive particles have a particle size of less than 15,000 μm, and wherein the composition is a free flowing powder and comprises less than 1,000 ppm of non-ionic emulsifiers.

2. The composition of claim 1 having an electrical conductivity according to ASTM F84 of at least 18 S/cm at 25° C.

3. The composition of claim 1 comprising from at least 5 wt.-% to no greater than 25 wt.-% of the perfluoropolymer and from at least 74 wt.-% of substantially inorganic electronically conductive material wherein the weight percentages are based on the total weight of the composition and wherein the total weight of the composition is 100%.

4. The composition of claim 1 wherein the inorganic material is selected from metals, metal alloys, and an electronically conductive form of carbon.

5. The composition of claim 1 wherein the inorganic material is selected from graphite.

6. The composition of claim 1 consisting of from 7 to 17% by weight of the perfluoropolymer, from at least 80% by weight of graphite and from 0% to less than 5% of other materials, and wherein the total amount of ingredients is 100% by weight.

7. The composition of claim 6 having an electrical conductivity according to ASTM F84 of at least 18 S/cm at 25° C.

8. The composition of claim 1 wherein the composition is obtained by subjecting an aqueous dispersion comprising the perfluoropolymer particles and the electronically conductive particles to a heat-treatment that removes water and surfactants under conditions where the perfluoropolymer does not melt.

9. The composition of claim 1 wherein the solid particles are coagulated particles.

10. A method for producing a powder composition comprising
(i) contacting substantially inorganic particles that are electronically conductive and have a particle size of less than 15,000 μm with an aqueous perfluoropolymer dispersion having perfluoropolymer particles of less than 500 nm particle size, wherein the perfluoropolymer dispersion comprises less than 1,000 ppm of non-ionic emulsifiers;
(ii) coagulating the particles, and
(iii) removing water and, if present, surfactants, to yield dry particles at conditions where the perfluoropolymer does not melt, wherein the composition is a free flowing powder comprising the perfluoropolymer particles adsorbed or deposited onto the substantially inorganic, electronically conductive material and;

wherein the perfluoropolymer is a copolymer of tetrafluoroethylene and at least one other perfluorinated comonomer and is melt-processable and has a melting point between 100° C. and 325° C. and a melt flow index at 372° C. and at 5 kg load of at least 0.1 and up to 100 g/10 min; and wherein the substantially inorganic particles comprise at least 95% by weight inorganic material that is electronically conductive based on the total weight of the substantially inorganic particles.

11. The method of claim 10, further comprising (iv) molding the composition into a shaped article, wherein prior to molding the composition may optionally be suspended or dispersed in an aqueous phase to provide a paste.

12. A method of providing a shaped article comprising
(i) providing a composition according to claim 1;
(ii) optionally, converting the composition into an aqueous paste; and
(iii) subjecting the composition to molding to yield a molded article.

13. An article comprising a component obtained from molding the composition of claim 1.

14. The article of claim 13, wherein the component is selected from a component of a fuel cell.

15. The article of claim 14, wherein the article is a bipolar separator plate for a fuel cell.

16. The powder composition of claim 1, wherein the perfluoropolymer is a copolymer of tetrafluoroethylene and hexafluoropropylene and has a melting point of at least 250° C.

17. The method of claim 10, wherein the perfluoropolymer is a copolymer of tetrafluoroethylene and hexafluoropropylene and has a melting point of at least 250° C.

* * * * *